United States Patent
Kim (10) Patent No.: US 9,075,259 B2
(45) Date of Patent: Jul. 7, 2015

(54) DISPLAY DEVICE AND TOUCH SENSING METHOD THEREOF

(71) Applicant: LG Display Co., Ltd., Seoul (KR)

(72) Inventor: Sung Chul Kim, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 142 days.

(21) Appl. No.: 13/873,420

(22) Filed: Apr. 30, 2013

(65) Prior Publication Data

US 2014/0160062 A1     Jun. 12, 2014

(30) Foreign Application Priority Data

Dec. 7, 2012  (KR) .................. 10-2012-0142363

(51) Int. Cl.
*G06F 3/041* (2006.01)
*G02F 1/1333* (2006.01)
*G06F 3/044* (2006.01)
*G09G 3/36* (2006.01)

(52) U.S. Cl.
CPC ............ *G02F 1/13338* (2013.01); *G06F 3/044* (2013.01); *G09G 3/36* (2013.01); *G06F 3/0412* (2013.01); *G06F 3/0418* (2013.01); *G02F 2201/121* (2013.01)

(58) Field of Classification Search
CPC ....... G06F 3/041; G06F 3/0412; G06F 3/044; G06F 3/0418; G09G 3/3611; G02F 2201/121; G02F 2001/134372; G02F 1/134363
See application file for complete search history.

(56) References Cited

U.S. PATENT DOCUMENTS

| | | | |
|---|---|---|---|
| 2010/0289765 A1* | 11/2010 | Noguchi et al. | 345/173 |
| 2010/0295824 A1* | 11/2010 | Noguchi et al. | 345/175 |
| 2011/0128254 A1* | 6/2011 | Teranishi et al. | 345/174 |
| 2011/0157069 A1* | 6/2011 | Zhuang et al. | 345/174 |
| 2011/0298746 A1* | 12/2011 | Hotelling | 345/174 |
| 2012/0001859 A1* | 1/2012 | Kim et al. | 345/173 |
| 2012/0113064 A1* | 5/2012 | White et al. | 345/178 |
| 2012/0182251 A1* | 7/2012 | Krah | 345/174 |
| 2012/0262390 A1* | 10/2012 | Kida et al. | 345/173 |
| 2013/0113735 A1* | 5/2013 | Takeuchi et al. | 345/173 |

* cited by examiner

Primary Examiner — Dwayne Bost
Assistant Examiner — Maheen Javed
(74) Attorney, Agent, or Firm — Morgan, Lewis & Bockius LLP (57) ABSTRACT

Disclosed is a display device. The display device includes a timing controller and a touch sensing unit. The timing controller temporally divides one frame period and drives a display panel such that a display mode for displaying an image in the display panel and a touch mode for sensing a user's touch are alternately driven. The touch sensing unit detects the user's touch with a DTX compensation value calculated by multiplying a DTX weight value and a maximum DTX amplitude of a touch sensing block which is obtained when a maximum grayscale value is applied to a plurality of pixels corresponding to the touch sensing block, in the touch mode. The DTX weight value is calculated by substituting an average value of grayscale values applied to the plurality of pixels corresponding to the touch sensing block into a normalization curve.

10 Claims, 9 Drawing Sheets

FIG. 1

Related Art

FIG. 2

Related Art

FIG. 3

Related Art

FIG. 4

Related Art

|   | X1 | X2 | X3 | X4 | X5 |   |   |   |   |   | ...... |   |   |   |   |   | X17 | X18 | X19 | X20 |     |
|---|----|----|----|----|----|---|---|---|---|---|---|---|---|---|---|---|---|---|---|----|-----|
|   | 69 | 99 | 94 | 120| 73 | 86| 121|156| 81| 65| 48| 21| 11| 14| 13| 16| 14| 76| 109| 71 | Y1  |
|   | 83 | 89 | 120|157 | 71 | 84| 69 |156|180|118|140| 16| 13| 11| 29| 14| 8 | 16| 53 | 78 | Y2  |
|   | 83 | 79 | 98 |137 |139 |139|124 |135|114|127|132| 20| 12| 33| 77| 33| 30| 36| 84 | 61 | Y3  |
|   |132 |122 |105 |119 |138 |137|196 |169|173|207|151| 41| 26| 32|103| 24| 35| 43|106 | 41 |     |
|   |107 | 78 |114 |100 | 68 |105| 65 |183|162|120|193| 82| 29| 84|136| 16| 71| 80|102 | 71 |     |
|   | 56 |125 |104 |121 | 70 |152|113 |146|178|172|101| 32| 22|141| 97| 14| 12| 67| 76 | 68 |     |
|   | 43 | 43 |162 |137 |131 | 71|102 | 41| 53| 63| 65| 33| 55| 35| 36| 40| 18| 14| 81 | 93 | ⋮   |
|   | 14 | 15 | 25 | 51 | 79 |117| 71 | 48| 55| 56| 72| 69| 51| 65| 78| 60| 57| 37| 60 | 89 |     |
|   | 15 | 25 | 14 |119 |108 |100| 49 | 58| 77| 26| 78| 92| 58| 63| 63| 54| 72| 45|104 | 80 |     |
|   | 19 | 8  | 14 | 81 |122 | 91| 90 |111| 73| 24| 62| 69|114|109|114| 52| 46| 57| 51 |154 | Y10 |
|   |107 | 80 | 68 | 23 |104 | 79|124 |137|140| 90|131| 67| 67| 82| 66| 41| 44|103|102 | 49 | Y11 |
|   |142 |108 |100 |114 | 92 |132| 89 | 54| 68| 85| 42| 66| 59| 69| 58| 67| 76| 59| 76 | 56 | Y12 |

FIG. 10

|   | X1 | X2 | X3 | X4 | X5 |   |   |   |   |   | ...... |   |   |   |   |   | X17 | X18 | X19 | X20 |     |
|---|----|----|----|----|----|---|---|---|---|---|---|---|---|---|---|---|---|---|---|----|-----|
|   |0.2 |0.24|0.25|0.31|0.22|0.24|0.32|0.39|0.24|0.21|0.17|0.12|0.08|0.09|0.09|0.1 |0.09|0.23|0.28|0.22| Y1  |
|   |0.24|0.21|0.31|0.39|0.22|0.24|0.21|0.39|0.46|0.31|0.36|0.1 |0.09|0.08|0.14|0.09|0.07|0.1 |0.18|0.23| Y2  |
|   |0.24|0.23|0.26|0.35|0.36|0.36|0.33|0.35|0.3 |0.33|0.34|0.12|0.08|0.14|0.23|0.14|0.14|0.14|0.24|0.2 | Y3  |
|   |0.34|0.32|0.27|0.31|0.35|0.35|0.55|0.43|0.44|0.6 |0.38|0.14|0.13|0.14|0.27|0.13|0.14|0.15|0.28|0.14|     |
|   |0.28|0.23|0.3 |0.27|0.21|0.27|0.21|0.48|0.41|0.31|0.53|0.24|0.14|0.24|0.35|0.1 |0.22|0.24|0.27|0.22|     |
|   |0.19|0.33|0.27|0.32|0.21|0.36|0.29|0.37|0.45|0.43|0.27|0.14|0.12|0.36|0.26|0.09|0.08|0.21|0.23|0.21|     |
|   |0.15|0.15|0.41|0.35|0.34|0.22|0.27|0.14|0.18|0.21|0.21|0.14|0.19|0.14|0.14|0.14|0.11|0.09|0.24|0.25| ⋮   |
|   |0.09|0.1 |0.13|0.19|0.23|0.31|0.22|0.17|0.19|0.19|0.22|0.21|0.18|0.21|0.23|0.2 |0.19|0.14|0.2 |0.24|     |
|   |0.1 |0.13|0.09|0.31|0.28|0.27|0.17|0.2 |0.23|0.13|0.23|0.25|0.2 |0.21|0.21|0.19|0.22|0.16|0.27|0.24|     |
|   |0.11|0.07|0.09|0.24|0.32|0.25|0.26|0.29|0.22|0.13|0.2 |0.21|0.3 |0.28|0.3 |0.18|0.16|0.19|0.18|0.38| Y10 |
|   |0.26|0.34|0.21|0.12|0.27|0.23|0.33|0.35|0.38|0.25|0.34|0.21|0.19|0.24|0.21|0.14|0.16|0.27|0.27|0.17| Y11 |
|   |0.36|0.28|0.27|0.3 |0.25|0.34|0.24|0.19|0.21|0.24|0.15|0.21|0.2 |0.21|0.2 |0.21|0.23|0.2 |0.23|0.19| Y12 |

FIG. 11

|  | X1 | X2 | X3 | X4 | X5 |  |  |  |  |  |  |  |  |  |  |  | X17 | X18 | X19 | X20 |  |
|---|---|---|---|---|---|---|---|---|---|---|---|---|---|---|---|---|---|---|---|---|---|
|  | 658 | 643 | 628 | 630 | 618 | 647 | 633 | 612 | 609 | 604 | 588 | 586 | 573 | 553 | 552 | 562 | 568 | 566 | 545 | 529 | Y1 |
|  | 656 | 649 | 642 | 639 | 641 | 637 | 625 | 630 | 608 | 616 | 580 | 585 | 564 | 581 | 559 | 571 | 561 | 584 | 563 | 572 | Y2 |
|  | 661 | 654 | 632 | 623 | 615 | 653 | 643 | 627 | 622 | 622 | 610 | 599 | 595 | 580 | 577 | 586 | 592 | 583 | 578 | 568 | Y3 |
|  | 657 | 646 | 646 | 645 | 644 | 643 | 632 | 636 | 623 | 627 | 600 | 597 | 580 | 597 | 572 | 584 | 572 | 586 | 579 | 598 |  |
|  | 632 | 621 | 607 | 612 | 595 | 639 | 626 | 607 | 607 | 608 | 597 | 600 | 594 | 577 | 572 | 575 | 572 | 567 | 565 | 558 |  |
|  | 625 | 613 | 612 | 615 | 616 | 619 | 611 | 623 | 603 | 615 | 588 | 597 | 579 | 584 | 566 | 569 | 556 | 572 | 569 | 585 |  |
|  | 588 | 631 | 580 | 594 | 617 | 581 | 598 | 625 | 605 | 603 | 587 | 598 | 562 | 566 | 625 | 563 | 556 | 551 | 544 | 562 | ⋮ |
|  | 606 | 608 | 579 | 601 | 602 | 627 | 573 | 611 | 608 | 590 | 590 | 568 | 588 | 569 | 646 | 556 | 536 | 535 | 569 | 574 |  |
|  | 576 | 595 | 569 | 580 | 593 | 562 | 585 | 609 | 585 | 587 | 566 | 585 | 541 | 586 | 616 | 561 | 567 | 553 | 547 | 569 |  |
|  | 597 | 591 | 563 | 587 | 582 | 602 | 558 | 600 | 582 | 574 | 573 | 557 | 572 | 542 | 534 | 545 | 535 | 537 | 572 | 579 | Y10 |
|  | 582 | 583 | 545 | 582 | 571 | 540 | 562 | 586 | 569 | 565 | 546 | 562 | 518 | 531 | 596 | 543 | 540 | 542 | 539 | 560 | Y11 |
|  | 575 | 572 | 550 | 566 | 556 | 576 | 533 | 567 | 557 | 567 | 547 | 533 | 548 | 536 | 531 | 530 | 524 | 522 | 544 | 550 | Y12 |

FIG. 12

|  | X1 | X2 | X3 | X4 | X5 |  |  |  |  |  |  |  |  |  |  |  | X17 | X18 | X19 | X20 |  |
|---|---|---|---|---|---|---|---|---|---|---|---|---|---|---|---|---|---|---|---|---|---|
|  | 130 | 157 | 159 | 198 | 135 | 157 | 201 | 237 | 145 | 126 | 98.2 | 69.8 | 45.4 | 51.4 | 48.4 | 57 | 52.8 | 128 | 154 | 114 | Y1 |
|  | 157 | 138 | 201 | 259 | 138 | 153 | 133 | 244 | 281 | 189 | 207 | 59.5 | 49.5 | 46 | 75.8 | 53.1 | 39.7 | 59.3 | 104 | 133 | Y2 |
|  | 158 | 153 | 155 | 213 | 219 | 232 | 209 | 218 | 184 | 206 | 208 | 70.2 | 49 | 80.3 | 132 | 81.4 | 80.7 | 82.1 | 139 | 115 | Y3 |
|  | 224 | 207 | 177 | 200 | 228 | 225 | 349 | 271 | 272 | 377 | 226 | 86 | 75.3 | 82.2 | 157 | 73.2 | 80.1 | 88.6 | 160 | 86.2 |  |
|  | 177 | 144 | 180 | 163 | 125 | 175 | 131 | 291 | 251 | 191 | 317 | 143 | 80.5 | 139 | 200 | 58.4 | 123 | 134 | 152 | 120 |  |
|  | 120 | 200 | 156 | 195 | 132 | 234 | 179 | 230 | 273 | 266 | 157 | 82.2 | 70 | 210 | 146 | 52.9 | 45.8 | 121 | 129 | 124 |  |
|  | 88.9 | 90.9 | 240 | 209 | 209 | 125 | 161 | 90 | 111 | 125 | 123 | 82.8 | 107 | 79.3 | 88.1 | 80.8 | 61.1 | 51.2 | 129 | 141 | ⋮ |
|  | 56.4 | 58.5 | 73.7 | 107 | 141 | 191 | 123 | 102 | 114 | 113 | 128 | 121 | 105 | 117 | 127 | 111 | 104 | 75.7 | 114 | 140 |  |
|  | 56 | 75.8 | 52.9 | 179 | 168 | 150 | 100 | 119 | 134 | 76.2 | 131 | 146 | 106 | 115 | 127 | 105 | 121 | 87.6 | 150 | 134 |  |
|  | 68.2 | 41.8 | 52.4 | 139 | 186 | 149 | 137 | 173 | 127 | 72 | 117 | 119 | 170 | 153 | 158 | 98.8 | 86.3 | 104 | 102 | 221 | Y10 |
|  | 154 | 133 | 116 | 68.2 | 157 | 127 | 183 | 205 | 210 | 139 | 185 | 119 | 101 | 127 | 125 | 78.2 | 84 | 149 | 145 | 95.9 | Y11 |
|  | 208 | 159 | 146 | 169 | 139 | 195 | 130 | 106 | 118 | 135 | 80.4 | 112 | 109 | 114 | 104 | 112 | 119 | 104 | 123 | 106 | Y12 |

FIG. 13

DISPLAY DEVICE AND TOUCH SENSING METHOD THEREOF

CROSS-REFERENCE TO RELATED APPLICATIONS

This application claims the benefit of the Korean Patent Application No. 10-2012-0142363 filed on Dec. 7, 2012, which is hereby incorporated by reference as if fully set forth herein.

BACKGROUND

1. Field of the Invention

The present invention relates to a display device and a touch sensing method thereof, and more particularly, to a display device with a built-in touch sensor and a touch sensing method thereof.

2. Discussion of the Related Art

With the advancement of various portable electronic devices such as mobile terminals and notebook computers, the demand for flat panel display devices applied to the portable electronic devices is increasing.

Liquid crystal display (LCD) devices, plasma display panels (PDPs), field emission display (FED) devices, light emitting diode (LED) display devices, and organic light emitting diode (OLED) display devices have been developed as flat panel display devices.

In such flat panel display devices, LCD devices are easily manufactured by advanced manufacturing technology and have drivability of drivers, low power consumption, high image quality, and a large screen, and thus, the application fields of the LCD devices are being expanded. LCD devices, including a built-in touch screen that enables a user to directly input information to a screen with a finger or a pen, are attracting much attention.

In applying a touch screen to LCD devices, a separately prepared touch panel is conventionally disposed on a liquid crystal panel, but, the LCD devices are recently developed in a type where the touch screen is built in a liquid crystal panel for slimming.

Especially, LCD devices using the existing elements, such as common electrodes formed in a lower substrate, as touch sensing electrodes are called in-cell touch LCD devices.

Figure 1:
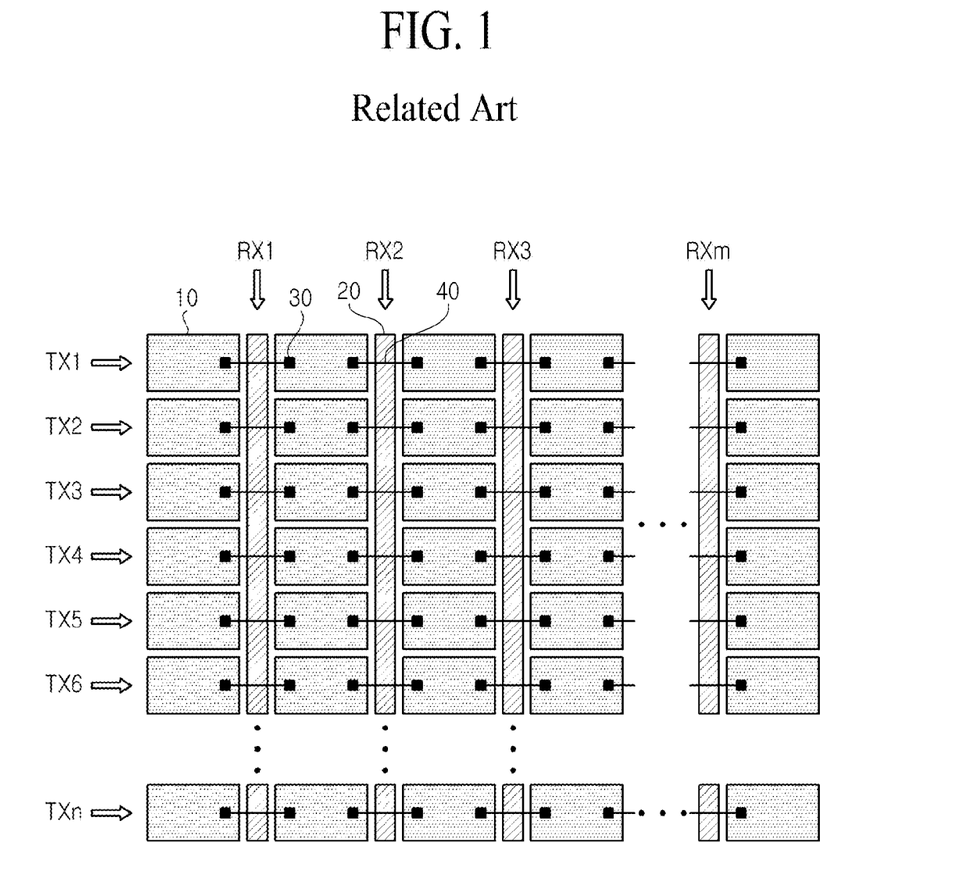
FIG. 1 is a diagram illustrating a structure of a touch screen panel in a related art in-cell touch type LCD device.

FIG. 1 is a diagram illustrating a structure of a touch screen panel in a related art in-cell touch type LCD device.

Referring to FIG. 1, the in-cell touch type LCD device uses a plurality of common electrodes, formed in a lower substrate (TFT array substrate), for display, and moreover uses the common electrodes as touch electrodes. In this case, the common electrodes are divided in units of pixels to configure a plurality of touch sensing blocks.

Specifically, among a plurality of pixels provided in the LCD device, a certain number of pixels (for example, 64×64 pixels) configures one touch sensing block. A plurality of touch sensing blocks are connected to each other in an X-axis direction to configure a plurality of touch driving electrodes 10 (TX), and a plurality of touch sensing electrodes 20 (RX) are arranged in a stripe type in a Y-axis direction. The touch driving electrodes 10 may be arranged in the X-axis direction identically to a direction of a gate line, and the touch sensing electrodes 20 may be arranged in the Y-axis direction identically to a direction of a data line.

In this case, a touch driving signal is applied to the touch driving electrodes 10 (TX), and the touch sensing electrodes 20 (RX) sense a capacitance change.

In in-cell touch LCD devices, display and touch sensing are temporally divided and driven due to a structural characteristic in which a plurality of pixels for display and a touch screen for touch detection are provided together.

During a touch sensing period (non-display period), when a capacitance is changed in a touch sensing block touched by a user's finger, a touch sensing electrode senses the changed capacitance, thereby determining whether there is the user's touch and a touched position.

In the related art, however, when touch sensors are disposed outside a liquid crystal panel, a display function and a touch sensing function are separately performed, and thus are not affected by each other. On the other hand, when the touch sensors are built in the liquid crystal panel, the display function and the touch sensing function are affected by each other. That is, touch sensing driving can affect display driving, or, the display driving can affect the touch sensing driving. This will now be described in more detail with reference to FIG. 2.

Figure 2:
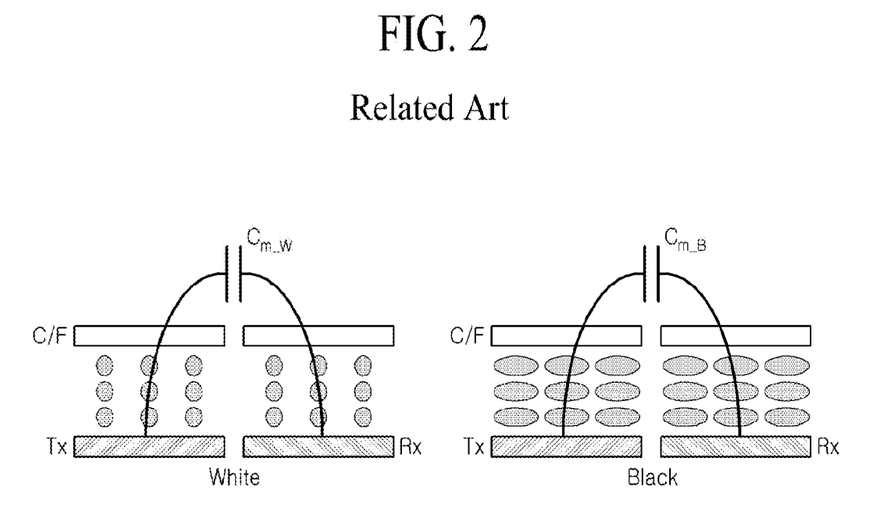
FIG. 2 is a view showing a capacitance change in a pixel displaying black and a capacitance change in a pixel displaying white, in the related art in-cell touch type LCD device.

FIG. 2 is a view showing a capacitance change in a pixel displaying black and a capacitance change in a pixel displaying white, in the related art in-cell touch type LCD device.

As seen in FIG. 2, a pixel "Black" displaying black and a pixel "White" displaying white differ in alignment of liquid crystal, and thus, a difference between capacitances of a liquid crystal layer occurs.

The capacitance difference between pixels is maintained in the pixels even after a touch sensing period is started, and affects touch sensitivity. The capacitance difference functioning like offset to act as noise to touch sensing is called display touch crosstalk.

The accuracy and stability of a touch being reduced by the display touch crosstalk causes a bigger problem to a differential capacitive touch type in which a touch is sensed with a capacitance difference between adjacent touch sensing electrodes. This will be described in detail with reference to FIG. 3.

Figure 3:
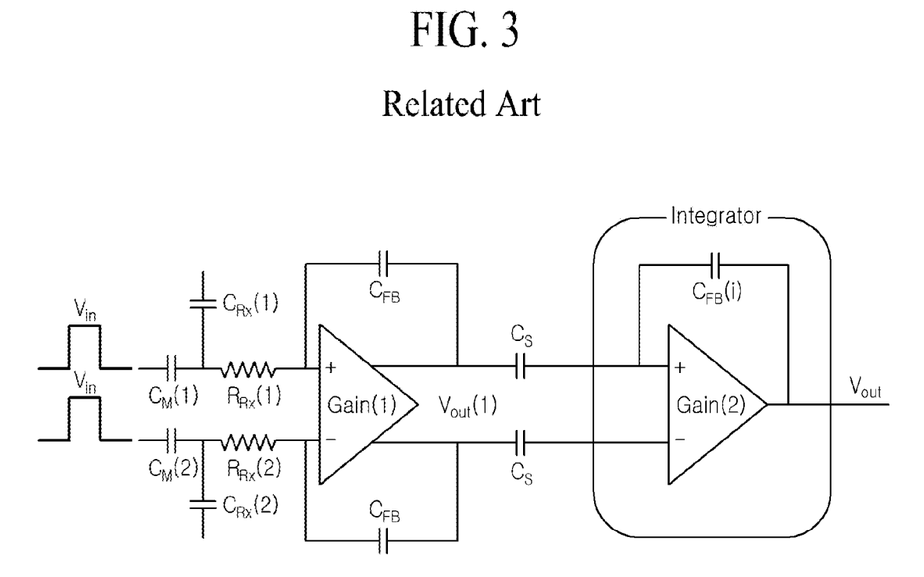
FIG. 3 is a diagram for describing a differential capacitive touch type in the related art in-cell touch type LCD device.

FIG. 3 is a diagram for describing a differential capacitive touch type in the related art in-cell touch type LCD device.

As seen in FIG. 3, in the differential capacitive touch type, the LCD device amplifies a capacitance difference (Cm(1)-Cm(2)) between adjacent touch sensing electrodes to determine whether there is a touch.

However, for example, when a pixel corresponding to one of adjacent touch sensing electrodes displays black and a pixel corresponding to the other displays white, a capacitance difference of a liquid crystal layer in the pixels displaying black and white acts like offset to a capacitance difference based on a touched position, causing display touch crosstalk. This will be described in detail with reference to FIG. 4.

Figure 4:
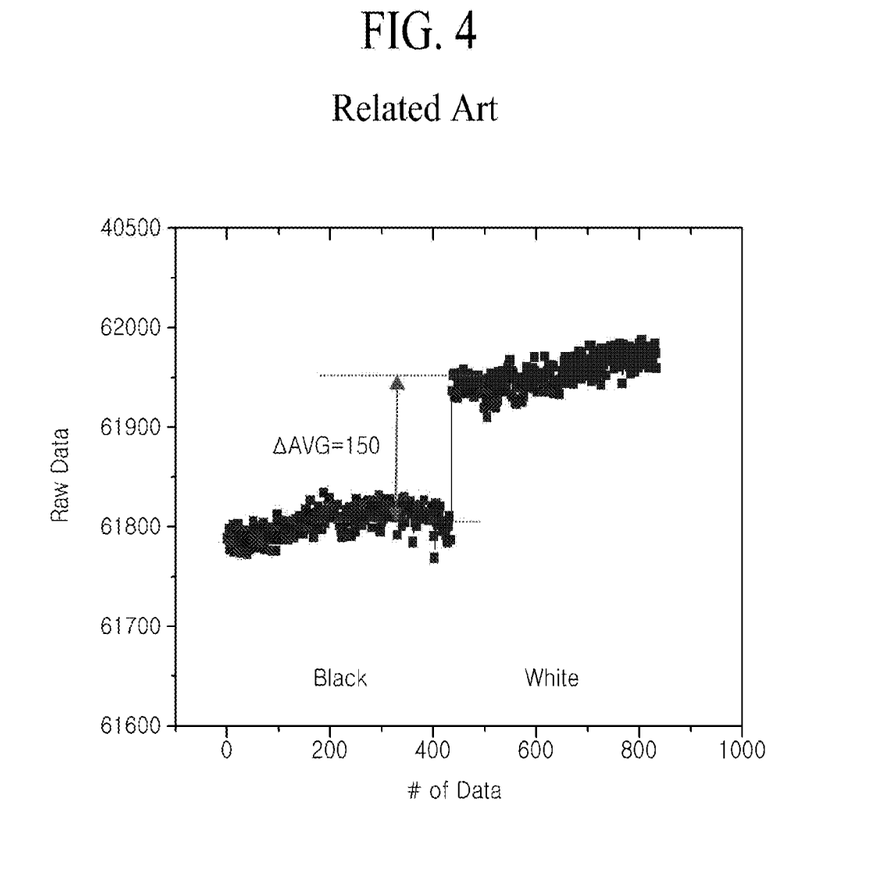
FIG. 4 is a diagram showing a touch raw data difference between a touch sensing block displaying black and a touch sensing block displaying white in the related art in-cell touch type LCD device.

FIG. 4 is a diagram showing a touch raw data difference between a touch sensing block displaying black and a touch sensing block displaying white in the related art in-cell touch type LCD device.

As seen in FIG. 4, the touch raw data difference between the touch sensing block displaying black and the touch sensing block displaying white is an average of 150 degrees. That is, even when there is no user's touch, a touch raw data difference is caused by a difference of display information displayed by a pixel corresponding to a corresponding touch sensing block.

For this reason, when a touch threshold value for detecting whether there is a user's touch is 100, even though there is no user's actual touch, a touch can be sensed.

SUMMARY

Accordingly, the present invention is directed to provide a display device and a touch sensing method thereof that substantially obviate one or more problems due to limitations and disadvantages of the related art.

An aspect of the present invention is directed to provide a display device and a touch sensing method thereof, which correct display touch crosstalk to sense a user's touch.

Another aspect of the present invention is directed to provide a display device and a touch sensing method thereof, which correct display touch crosstalk to a user's touch, thus enhancing a touch sensing rate.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided a display device including: a timing controller temporally dividing one frame period and driving a display panel such that a display mode for displaying an image in the display panel and a touch mode for sensing a user's touch are alternately driven; and a touch sensing unit detecting the user's touch with a DTX compensation value calculated by multiplying a DTX weight value and a maximum DTX amplitude of a touch sensing block which is obtained when a maximum grayscale value is applied to a plurality of pixels corresponding to the touch sensing block, in the touch mode, the DTX weight value being calculated by substituting an average value of grayscale values applied to the plurality of pixels corresponding to the touch sensing block into a normalization curve, wherein the normalization curve is calculated by normalizing DTX amplitude change characteristics of the touch sensing block based on changes in the grayscale values applied to the plurality of pixels corresponding to the touch sensing block.

In another aspect of the present invention, there is provided a touch sensing method of a display device, which temporally divides one frame period and drives a display panel such that a display mode for displaying an image in the display panel and a touch mode for sensing a user's touch are alternately driven, including: substituting an average value of grayscale values applied to a plurality of pixels corresponding to a touch sensing block into a calculated normalization curve, in which an X-axis indicates the average value of grayscale values applied to the plurality of pixels corresponding to the touch sensing block and a Y-axis indicates a DTX amplitude of the touch sensing block based on changes in the grayscale values, to calculate a DTX weight value in the touch mode; and multiplying the DTX weight value and a maximum DTX amplitude of the touch sensing block, which is obtained when a maximum grayscale value is applied to the pixels corresponding to the touch sensing block, to calculate a DTX compensation value.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings:

FIG. 9 is a diagram showing an embodiment of a grayscale average value of a touch sensing block which is input to a weight applier included in the display device according to the present invention;

FIG. 10 is a diagram showing an embodiment of DTX weight values calculated by the weight applier included in the display device according to the present invention;

FIG. 11 is a diagram showing an embodiment of a lookup table stored in a lookup table storage unit included in the display device according to the present invention;

FIG. 12 is a diagram showing an embodiment of DTX weight values calculated by a compensation value calculator included in the display device according to the present invention.

DETAILED DESCRIPTION OF THE INVENTION

Reference will now be made in detail to the exemplary embodiments of the present invention, examples of which are illustrated in the accompanying drawings. Wherever possible, the same reference numbers will be used throughout the drawings to refer to the same or like parts.

Hereinafter, a display device and a touch sensing method thereof according to the present invention will be described in detail with reference to the accompanying drawings.

In an embodiment, a display device according to the present invention may be an LCD device. Hereinafter, for convenience, the LCD device will be described as an example of the display device according to the present invention. However, the display device according to the present invention is not limited to the LCD device.

LCD devices are variously developed in a twisted nematic (TN) mode, a vertical alignment (VA) mode, an in-plane switching (IPS) mode, or a fringe field switching (FFS) mode depending on a scheme of adjusting the alignment of liquid crystal.

In such modes, the IPS mode and the FFS mode are modes in which a plurality of pixel electrodes and common electrodes are arranged on a lower substrate, and thus, the alignment of liquid crystal is adjusted with electric fields between the pixel electrodes and the common electrodes.

The present invention may be applied to an LCD device having a structure in which a plurality of pixels electrodes and common electrodes are disposed on a lower substrate as in the IPS mode or the FFS mode.

However, the present invention is not limited thereto, and may be an LCD device having a structure in which the pixel electrodes are disposed on the lower substrate and the common electrodes are disposed on an upper substrate as in the TN mode or the VA mode.

Figure 5:
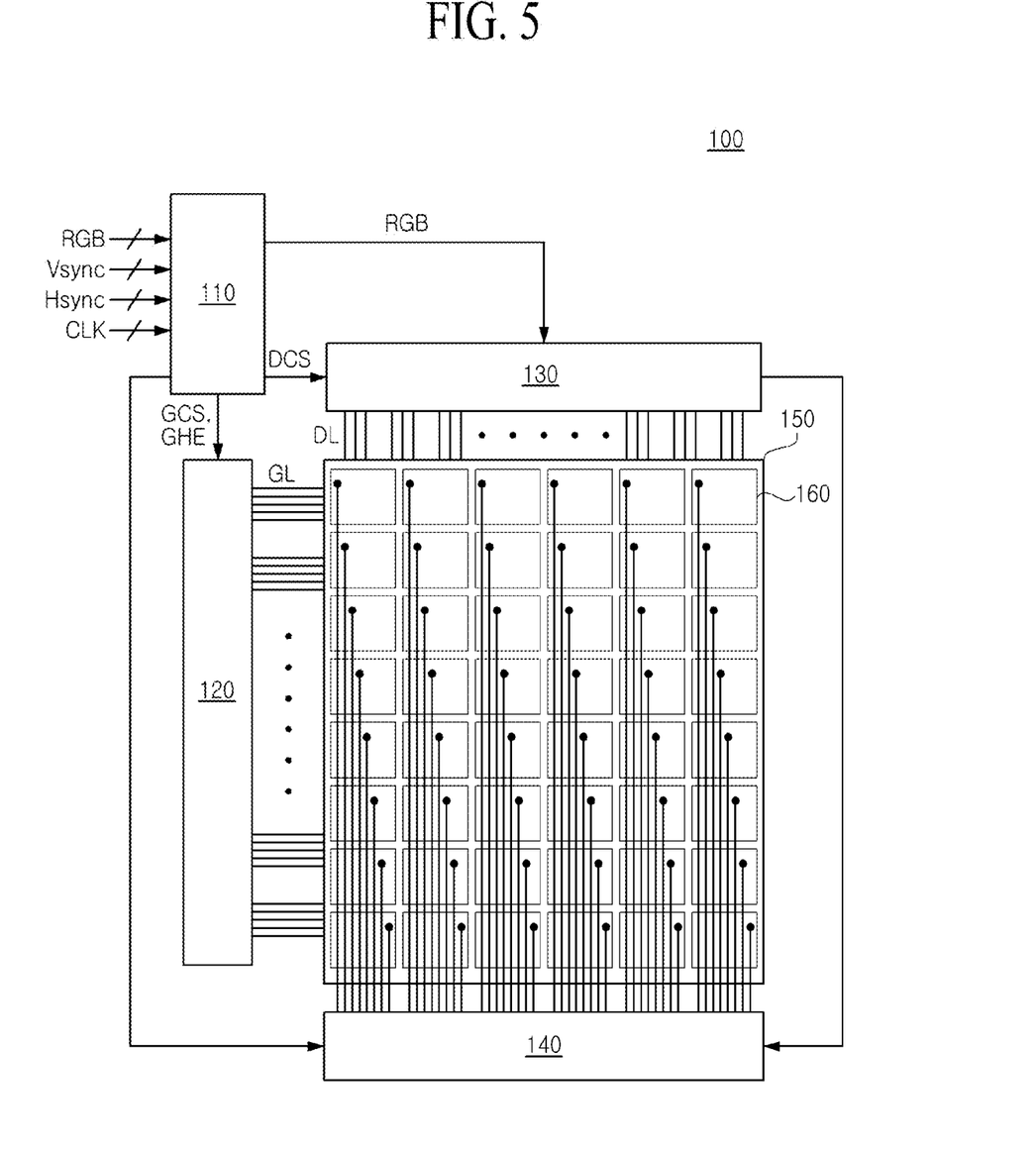
FIG. 5 is a diagram illustrating an embodiment of a display device according to the present invention.

FIG. 5 is a diagram illustrating an embodiment of a display device according to the present invention.

As seen in FIG. 5, a display device 100 according to the present invention includes a timing controller 110, a gate driver 120, a data driver 130, a touch sensing unit 140, a display panel 150, and a plurality of touch sensing blocks 160.

The timing controller 110 temporally divides one frame period and drives the display panel 150 such that a display mode for displaying an image in the display panel 150 and a touch mode for sensing a user's touch are alternately driven.

In the display mode, the timing controller 110 aligns external video signals to convert the video signals into frame-unit digital image data RGB, and supplies the digital image data to the data driver 130.

In the display mode, the timing controller 110 generates a gate control signal GCS for controlling the gate driver 120 and a data control signal DCS for controlling the data driver 130 with a vertical sync signal Vsync, a horizontal sync signal Hsync, and a clock signal CLK which are input from the outside.

The gate control signal GCS is supplied to the gate driver 120, and the data control signal DCS is supplied to the data driver 130.

Here, the data control signal DCS may include a source start pulse SSP, a source sampling clock SSC, a source output enable signal SOE, and a polarity control signal POL.

The gate control signal GCS may include a gate start pulse GSP, a gate shift clock GSC, and a gate output enable signal GOE.

The following description will be made of an operation in which the display mode for displaying an image in the display panel 150 and the touch mode for sensing a user's touch are temporally divided and alternately driven by the timing controller 110 during one frame period.

Figure 6:
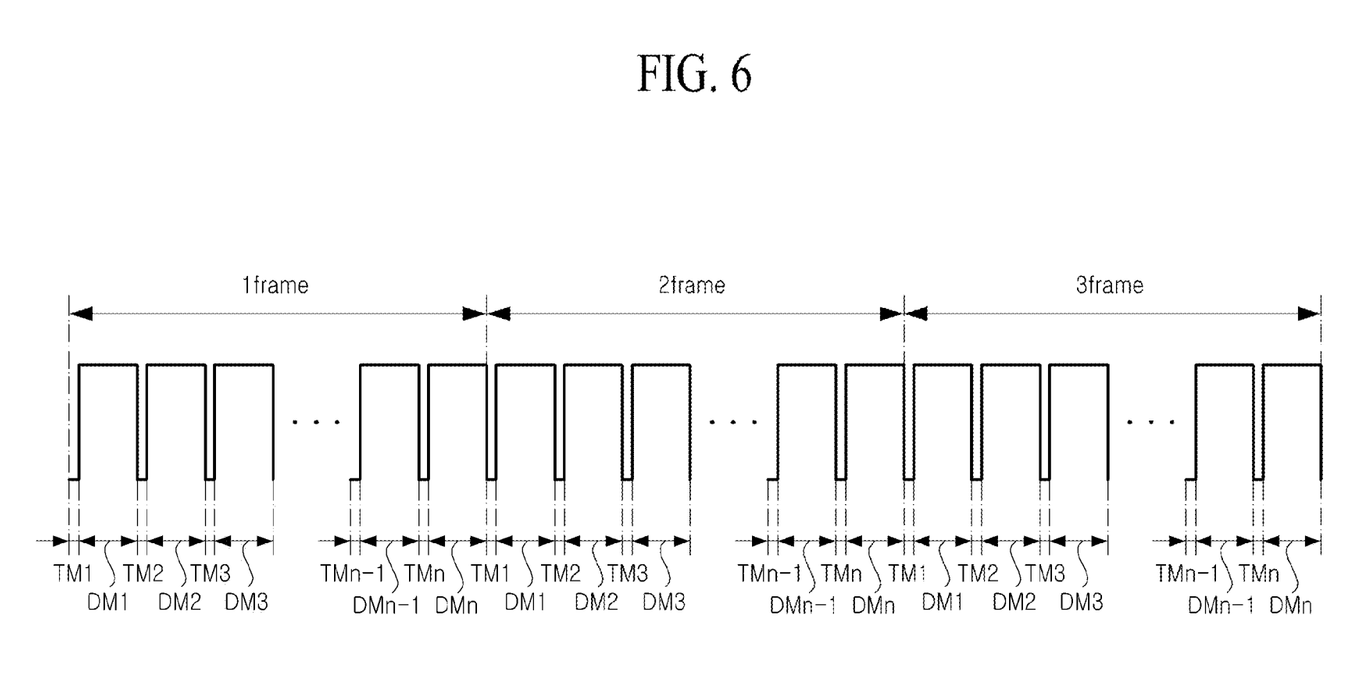
FIG. 6 is a diagram showing that a display mode and a touch mode are time-division driven alternately in the display device according to the present invention.

FIG. 6 is a diagram showing that the display mode and the touch mode are time-division driven alternately in the display device according to the present invention.

As seen in FIG. 6, the timing controller 110 of the display device 100 according to the present invention temporally divides one frame period and time-division drives the display panel 150 such that the display mode DM for displaying an image in the display panel 150 and the touch mode TM for sensing a user's touch are alternately driven.

The display mode denotes a mode for displaying a desired image in the display panel 150, and the touch mode denotes a mode for sensing a touch position of a user that touches the display panel 150.

In an embodiment, when the touch sensing blocks 160 are disposed in n number of rows in a direction parallel to the gate line in the display panel 150, the timing controller 110 alternately drives the touch mode TM and the display mode DM n number of times so as to enable the sensing of a user's touch by using the touch sensing blocks 160 disposed in all rows during one frame.

Specifically, the timing controller 110 drives a touch mode TM1 and a display mode DM1 on a touch sensing block 160 disposed in a first row during one frame period, drives a touch mode TM2 and a display mode DM2 on a touch sensing block 160 disposed in a second row during one frame period, drives a touch mode TM(n−1) and a display mode DM(n−1) on a touch sensing block 160 disposed in an N−1st row during one frame period, and drives a touch mode TMn and a display mode DMn on a touch sensing block 160 disposed in an nth row during one frame period, thereby time-division controlling the touch sensing block 160 disposed in a total of n rows.

According to an embodiment, in a XGA-class TFT-LCD device including 768 gate lines as an example, a time for which a thin film transistor (TFT) connected to a gate line is turned on is 21 usec or less, and, when the TFT is refreshed at a speed of 60 frames per second, one frame time is 16.7 msec. Therefore, the touch mode and the display mode are repeatedly performed at intervals of 16.7 ms.

In this case, the touch mode is maintained for a time relatively shorter than a maintenance time of the display mode. That is, the touch mode is maintained and driven for a short time between the touch mode and the display mode, and thus does not affect the quality of an image displayed by a liquid crystal panel. In an embodiment, the touch mode may be driven for one-tenth, one-fortieth, or less of a time for which the display mode is driven.

The gate driver 120 turns on a plurality of switching elements connected to a gate line for displaying an image in the display mode. In an embodiment, the gate driver 120 may receive a signal from the timing controller 110 to apply a gate high voltage (VGH) to the gate line, thereby turning on the switching elements.

When the switching elements connected to the gate line are turned on, the data driver 130 outputs display data to the data lines. Here, the display data may be grayscale values including grayscale information for displaying an image.

The touch sensing unit 140 determines the user's touch with touch raw data input from an adjacent touch sensing block 160 in the touch mode.

In an embodiment, the touch sensing unit 140 may determine the user's touch with a differential of display information displayed by the adjacent touch sensing block in the display mode, but the display device according to the present invention is not limited thereto.

Hereinafter, the touch sensing unit 140 will be described in more detail with reference to the drawing.

Figure 7:
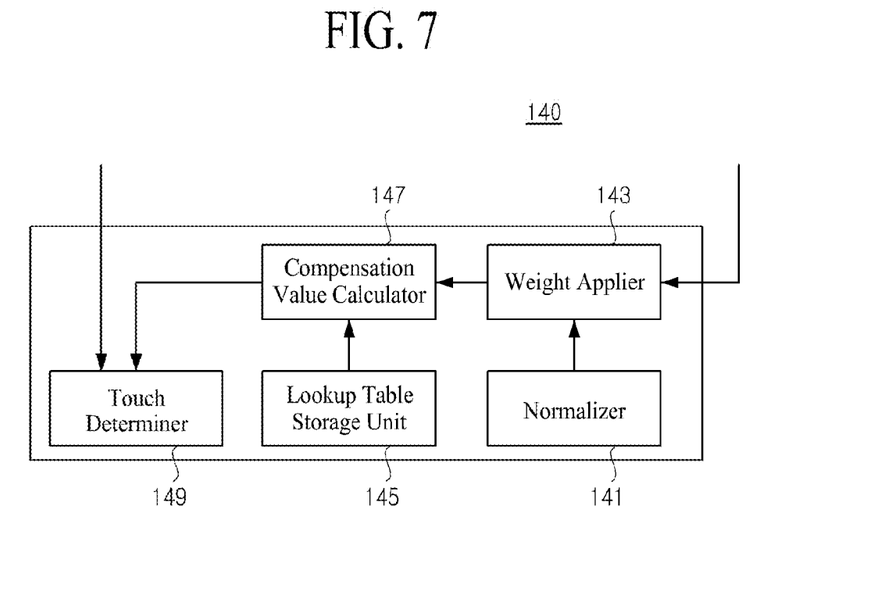
FIG. 7 is a diagram illustrating an embodiment of a touch sensing unit in the display device according to the present invention.

FIG. 7 is a diagram illustrating an embodiment of the touch sensing unit in the display device according to the present invention.

As seen in FIG. 7, in an embodiment, the touch sensing unit 140 of the display device according to the present invention includes a normalizer 141, a weight applier 143, a lookup table storage unit 145, a compensation value calculator 147, and a touch determiner 149. In the touch mode, the touch sensing unit 140 determines a user's touch with a DTX compensation value which is calculated by multiplying a DTX weight value, calculated by substituting an average value of grayscale values (applied to a plurality of pixels corresponding to a specific touch sensing block 160) into a normalization curve, and the maximum DTX amplitude of the specific touch sensing block 160 which is obtained when the maximum grayscale value is applied to the pixels corresponding to the specific touch sensing block 160.

The normalizer 141 calculates the normalization curve in which the X-axis indicates an average value of grayscale values applied to a plurality of pixels corresponding to a specific touch sensing block 160 and the Y-axis indicates a DTX amplitude of the touch sensing block 160 based on the changes in the grayscale values.

Figure 8:
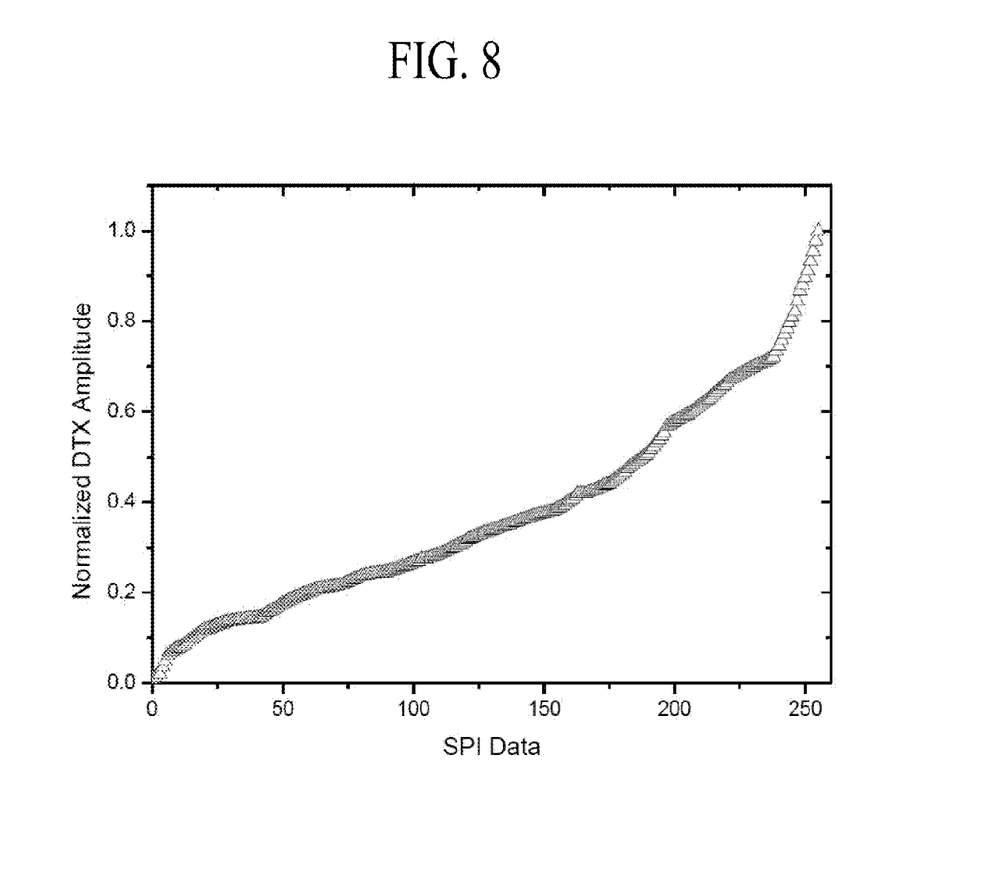
FIG. 8 is a diagram illustrating an embodiment of a normalization curve calculated by a normalizer included in the display device according to the present invention.

FIG. 8 is a diagram illustrating an embodiment of the normalization curve calculated by the normalizer included in the display device according to the present invention.

As seen in FIG. 8, the normalizer 141 calculates the normalization curve in which a DTX amplitude change characteristic of the touch sensing block 160 based on the changes in grayscale values applied to the plurality of pixels corresponding to the touch sensing block 160 is normalized.

Each of the touch sensing blocks 160 corresponds to a plurality of pixels, and grayscale values for displaying an image are respectively applied to the pixels in the display mode. Therefore, in an embodiment, each of the grayscale values may be an average value of grayscale values respectively applied to the pixels corresponding to each touch sensing block 160.

In an embodiment, the normalizer 141 calculates the normalization curve in which the X-axis indicates an average value of grayscale values applied to a plurality of pixels corresponding to a specific touch sensing blocks 160 and the Y-axis indicates a DTX amplitude of each touch sensing block 160 based on the changes in the grayscale values.

In this case, the normalization curve may be a curve that is normalized by dividing a DTX amplitude of the touch sensing block 160 (based on the changes in the grayscale values) by a DTX amplitude of the touch sensing block 160 when a grayscale value is 255, in order for the Y-axis value to have 0 to 1, but is not limited thereto.

To provide an additional description, the plurality of touch sensing blocks 160 are arranged in the display panel 150, and, in an embodiment, the normalization curve calculated by the normalizer 141 may be a normalization curve which is extracted from one of the plurality of touch sensing blocks 160. In this case, normalization curves extracted from the respective touch sensing blocks 160 hardly have a difference, and thus, a normalization curve extracted from an arbitrary touch sensing block 160 may be applied as a representative normalization curve.

In another embodiment, the normalization curve calculated by the normalizer 141 may be calculated by averaging normalization curves extracted from the respective touch sensing blocks 160. When the normalization curves extracted from the respective touch sensing blocks 160 have a small difference due to positions of the touch sensing blocks 160, a differential of a normalization curve can be minimized by averaging the normalization curves.

Referring again to FIG. 7, the weight applier 143 calculates a value corresponding to the Y-axis of the normalization curve as a DTX weight value of the touch sensing block 160 when an average value of grayscale values applied to the plurality of pixels corresponding to the touch sensing block 160 is substituted into the X-axis of the normalization curve in the display mode. A more detailed description on this will be made with reference to FIGS. 9 and 10. Although a separate description is not provided below, as an example, FIGS. 9 to 12 are for describing a display device, including a total of 240 touch sensing blocks 160, in which twenty touch sensing blocks 160 (X1 to X20) are arranged in the X-axis direction, and twelve touch sensing blocks 160 (Y1 to Y12) are arranged in the Y-axis direction.

FIG. 9 is a diagram showing an embodiment of a grayscale average value of a touch sensing block which is input to the weight applier included in the display device according to the present invention. FIG. 10 is a diagram showing an embodiment of DTX weight values calculated by the weight applier included in the display device according to the present invention.

As seen in FIG. 9, the weight applier 143 may receive a grayscale average value of each touch sensing block 160 from outside the touch sensing unit 140. In an embodiment, the weight applier 143 may receive the grayscale average value from the data driver 130, but is not limited thereto.

As described above, the weight applier 143 calculates a value corresponding to the Y-axis of the normalization curve as a DTX weight value of each touch sensing block 160 when an average value of grayscale values applied to a plurality of pixels corresponding to each touch sensing block 160 is substituted into the X-axis of the normalization curve in the display mode. This will now be described with a specific touch sensing block 160, corresponding to X1 and Y1 in FIGS. 8 and 9, as an example.

As seen in FIG. 9, a grayscale average value of the touch sensing block 160 corresponding to X1 and Y1 may be 60. A value of 0.2 may be extracted from the Y-axis by substituting the grayscale average value of 60 into the X-axis of the normalization curve of FIG. 8. Here, 0.2 is a DTX weight value of the touch sensing block 160 corresponding to X1 and Y1.

In this way, when a DTX weight value is calculated by substituting the grayscale average value of FIG. 9 into each of the normalization curves, a DTX weight based on a screen displaying a current frame may be calculated as shown in FIG. 10.

Referring again to FIG. 7, when the maximum grayscale value is applied to a plurality of pixels corresponding to a specific touch sensing block 160, the lookup table storage unit 145 measures the maximum DTX amplitude of the touch sensing block 160 and stores the measured maximum DTX amplitudes as the lookup table.

The plurality of touch sensing blocks 160 included in the display panel 150 may have different maximum DTX amplitudes measured independently from the maximum grayscale average value being input thereto, depending on a unique characteristic. Therefore, the lookup table storage unit 145 included in the display device 100 according to the present invention measures the maximum DTX amplitude of each touch sensing block 160 to store the measured maximum DTX amplitudes as a lookup table, and supplies the lookup table to the compensation value calculator 147. A more detailed description on this will be made with reference to FIG. 11.

FIG. 11 is a diagram showing an embodiment of the lookup table stored in the lookup table storage unit included in the display device according to the present invention.

As seen in FIG. 11, when the maximum grayscale average value is input, the maximum DTX amplitudes measured from the respective touch sensing blocks 160 differ.

The lookup table storage unit 145 stores the measured results as a lookup table shown in FIG. 11, and supplies the lookup table to the compensation value calculator 147.

Referring again to FIG. 7, the compensation value calculator 147 multiplies the maximum DTX amplitude of a specific touch sensing block 160 by the DTX weight value of each touch sensing block 160 to calculate a DTX compensation value of the touch sensing block 160.

The compensation value calculator 147 receives the DTX weight value of the touch sensing block 160 calculated by the weight applier 143 and the lookup table calculated by the lookup table storage unit 145, and multiplies the DTX weight value and maximum DTX amplitude of the touch sensing block 160 to calculate a DTX compensation value. A more detailed description on this will now be made with reference to FIG. 12.

FIG. 12 is a diagram showing an embodiment of DTX weight values calculated by the compensation value calculator included in the display device according to the present invention.

As seen in FIG. 12, the compensation value calculator 147 receives the DTX weight value of the touch sensing block 160 calculated by the weight applier 143 and the lookup table calculated by the lookup table storage unit 145, and multiplies the DTX weight value and maximum DTX amplitude of the touch sensing block 160 to calculate the DTX compensation value.

For example, it can be seen that the maximum DTX amplitude of the touch sensing block 160 corresponding to X1 and Y1 is 650, and the DTX weight value of the touch sensing block 160 is 0.2. Thus, the compensation value calculator 147 calculates 130 of the multiplication of 650 and 0.2 as the DTX compensation value of the touch sensing block 160 corresponding to X1 and Y1.

Referring again to FIG. 7, the touch calculator 149 adds the DTX compensation value to a user's touch raw data measured from the touch sensing block 160 to compensate for the touch raw data, and compares the touch raw data and a touch threshold value to determine whether there is the user's touch.

The touch calculator 149 receives the touch raw data measured from the touch sensing block 160 through a corresponding touch sensing line RX, and receives the DTX compensation value from the compensation value calculator 147.

The DTX compensation value is a differential of the touch raw data of the touch sensing block 160, and thus, the touch calculator 149 adds the DTX compensation value to the touch raw data to compensate for the touch raw data.

In an embodiment, when the compensated touch raw data is greater than a predetermined touch threshold value, the touch calculator 149 determines there to be a user's touch, and, when the compensated touch raw data is less than the predetermined touch threshold value, the touch calculator 149 determines there to be no user's touch.

Referring again to FIG. 5, the display panel 150 includes the plurality of gate lines GL, the plurality of data lines DL, the plurality of pixel electrodes, and the plurality of common electrodes. The display panel 150 displays a desired image in the display mode, and, in the touch mode, the display panel 150 receives a user's touch.

The gate lines GL are arranged on a substrate in one direction, for example, a width direction. The data lines DL are arranged on the substrate in the other direction, for example, a height direction. Thus, the gate lines GL and the data lines DL are arranged to intersect each other, thereby defining a plurality of pixel areas.

For example, each of the pixels may be one of red (R), green (G), blue (B), and white (W) pixels. The data lines DL may be disposed on a layer different from that of the gate lines GL. The data lines DL may be formed in a straight-line shape, but are not limited thereto. As another example, the data lines DL may be formed in a curved-line shape.

Although not shown, a thin film transistor (TFT) is provided as a switching element in each of a plurality of areas in which the data lines DL intersect the gate lines GL. Each of the thin film transistors may include a gate electrode, a semiconductor layer, a source electrode, and a drain electrode. The gate electrode may be connected to a corresponding gate line GL, the source electrode may be connected to a corresponding data line DL, and the drain electrode may face the source electrode to be separated therefrom.

The structure of the thin film transistor may be variously changed like a bottom gate structure in which the gate electrode is disposed under the semiconductor layer or a top gate structure in which the gate electrode is disposed on the semiconductor layer. Also, a shape of each of the electrodes may be changed to various shapes known to those skilled in the art.

A pixel electrode is provided in each of the pixel areas, and electrically connected to the drain electrode of the thin film transistor. Especially, the pixel electrode may be directly connected to the drain electrode, but is not limited to thereto.

The common electrodes receive a common voltage (Vcom) in the display mode displaying an image, thereby enabling the display of an image. Furthermore, in the touch mode sensing a user's touch, the common electrodes are driven as touch electrodes to detect a touch.

Specifically, in the display mode, the common electrodes generate electric fields together with the pixel electrodes to drive a liquid crystal layer. In an embodiment, each of the common electrodes or pixel electrodes may include at least one or more slits in a corresponding pixel area. A fringe field may be generated between a corresponding common electrode and pixel electrode through the slit, and liquid crystal may be driven with the fringe field.

Each common electrode, as described above, generates an electric field to drive the liquid crystal, and moreover, in the touch mode, each common electrode generate a capacitance together with a touch object (for example, a finger or a pen) so as to enable the sensing of a position touched by a user.

Each of the touch sensing blocks 160 is an area recognized as one area according to a user's touch, and may be formed by patterning the common electrodes that are disposed in the display panel 150 and generate electric fields together with the pixel electrodes to enable the display of an image in the display mode.

In this case, the common electrodes generate electric fields together with the pixel electrodes, which are disposed in the respective pixel areas defined by intersection of the gate lines and data lines that are arranged to intersect each other on the substrate, to enable the display of an image during the display mode. In the touch mode, the common electrodes may act as touch electrodes for sensing a changed capacitance due to a user's touch.

<Touch Sensing Method of Display Device>

Hereinafter, a touch sensing method of the display device according to the present invention will be described in detail with reference to the drawing.

Figure 13:
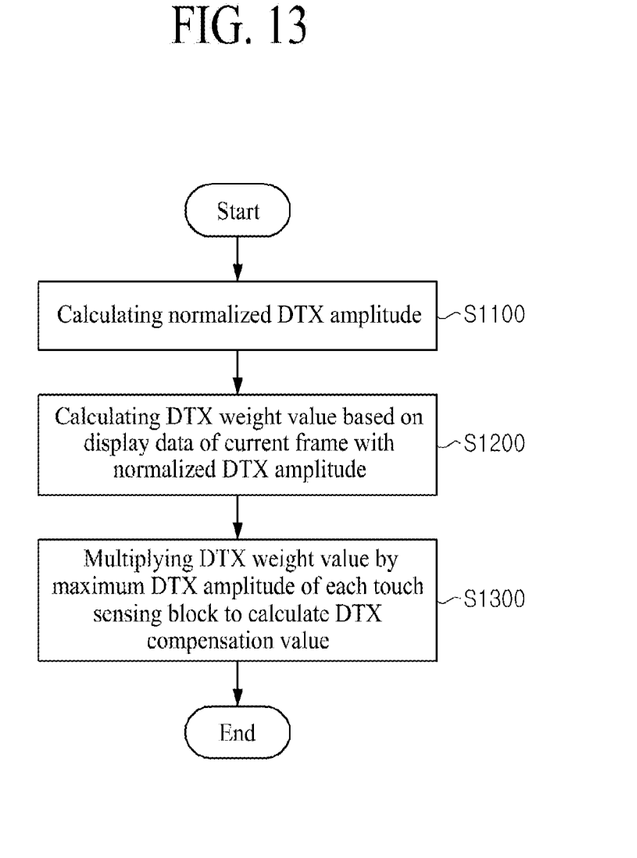
FIG. 13 is a flowchart illustrating an embodiment of a touch sensing method of the display device according to the present invention.

FIG. 13 is a flowchart illustrating an embodiment of a touch sensing method of the display device according to the present invention.

As seen in FIG. 13, the touch sensing method of the display device according to the present invention temporally divides one frame period and drives the display panel 150 such that the display mode for displaying an image in the display panel 150 and a touch mode for sensing a user's touch are alternately driven.

To provide a detailed description on this, in the touch mode, the touch sensing method calculates a normalized DTX amplitude with a calculated normalization curve in which the X-axis indicates an average value of grayscale values applied to a plurality of pixels corresponding to a specific touch sensing block and the Y-axis indicates a DTX amplitude of the touch sensing block based on the changes in the grayscale values, in operation S1100.

Subsequently, the touch sensing method substitutes the average value of grayscale values (applied to the plurality of pixels corresponding to the touch sensing block) into the normalization curve to calculate a DTX weight value based on display data of a current frame, in operation S1200.

Here, operation S1200 may further include an operation that, when the maximum grayscale value is applied to the pixels corresponding to the touch sensing block, measures the maximum DTX amplitude of the touch sensing block to calculate a lookup table.

Subsequently, the touch sensing method multiplies the maximum DTX amplitude of each touch sensing block by the DTX weight value to calculate a compensation value, in operation S1300.

That is, when the DTX weight value and the maximum grayscale value applied to are applied, the touch sensing method multiplies the DTX weight value and the maximum DTX amplitude (obtained when the maximum grayscale value applied to the pixels corresponding to the touch sensing block) of the touch sensing block to calculate the DTX compensation value.

Subsequently, the touch sensing method adds the DTX compensation value to a user's touch raw data measured from the touch sensing block to compensate for the touch raw data, and compares the touch raw data and the touch threshold value to determine whether there is the user's touch.

As described above, the present invention corrects display touch crosstalk, thereby removing noise from a touch signal.

Moreover, noise of a touch signal is reduced, thus enhancing a touch sensing rate by a user.

Moreover, noise of a touch signal is reduced, thus enhancing accuracy of touch sensing by a user.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A display device, comprising:
    a timing controller configured to:
        temporally divide one frame period; and
        drive a display panel such that a display mode for displaying an image in the display panel and a touch mode for sensing a user's touch are alternately driven; and
    a touch sensing unit configured to detect the user's touch with a display to touch crosstalk (DTX) compensation value calculated by multiplying a DTX weight value and a maximum DTX amplitude of a touch sensing block, the maximum DTX amplitude being obtained when a maximum grayscale value is applied to a plurality of pixels corresponding to the touch sensing block, in the touch mode, the DTX weight value being calculated by substituting an average value of grayscale values applied to the plurality of pixels corresponding to the touch sensing block into a normalization curve,
    wherein the normalization curve is calculated by normalizing DTX amplitude change characteristics of the touch sensing block based on changes in the grayscale values applied to the plurality of pixels corresponding to the touch sensing block.

2. The display device of claim 1, wherein the touch sensing unit comprises a normalizer configured to calculate the normalization curve in which:
    an X-axis indicates the average value of grayscale values applied to the plurality of pixels corresponding to the touch sensing block; and
    a Y-axis indicates a DTX amplitude of the touch sensing block based on the changes in the grayscale values.

3. The display device of claim 2, wherein the normalization curve is normalized for a Y-axis value to have 0 to 1 by dividing the DTX amplitude of the touch sensing block, based on the changes in the grayscale values, by a DTX amplitude of the touch sensing block which is obtained when a grayscale value is 255.

4. The display device of claim 1, wherein the touch sensing unit comprises a weight applier configured to calculate a value, corresponding to a Y-axis of the normalization curve, as a DTX weight value of the touch sensing block when the average value of grayscale values applied to the plurality of pixels corresponding to the touch sensing block is substituted into an X-axis of the normalization curve, in the display mode.

5. The display device of claim 1, wherein the touch sensing unit comprises a lookup table storage unit configured to measure the maximum DTX amplitude of the touch sensing block, which is obtained when the maximum grayscale value is applied to the plurality of pixels corresponding to the touch sensing block, to calculate a lookup table.

6. The display device of claim 1, wherein the touch sensing unit comprises a compensation value calculator configured to multiply the maximum DTX amplitude of the touch sensing block by the DTX weight value of the touch sensing block to calculate a DTX compensation value of the touch sensing block.

7. The display device of claim 1, wherein the touch sensing unit comprises a touch calculator configured to:
    add the DTX compensation value to a user's touch raw data measured from the touch sensing block to compensate for the touch raw data; and
    compare the touch raw data and a touch threshold value to determine whether there is the user's touch.

8. A touch sensing method of a display device, which temporally divides one frame period and drives a display panel such that a display mode for displaying an image in the display panel and a touch mode for sensing a user's touch are alternately driven, the touch sensing method comprising:
    substituting an average value of grayscale values applied to a plurality of pixels corresponding to a touch sensing block into a calculated normalization curve, in which an X-axis indicates the average value of grayscale values applied to the plurality of pixels corresponding to the touch sensing block and a Y-axis indicates a display to touch crosstalk (DTX) amplitude of the touch sensing block based on changes in the grayscale values, to calculate a DTX weight value in the touch mode; and
    multiplying the DTX weight value and a maximum DTX amplitude of the touch sensing block, the maximum DTX amplitude being obtained when a maximum grayscale value is applied to the pixels corresponding to the touch sensing block, to calculate a DTX compensation value.

9. The touch sensing method of claim 8, further comprising, after the calculating of a DTX compensation value:
    adding the DTX compensation value to a user's touch raw data measured from the touch sensing block to compensate for the touch raw data; and
    comparing the touch raw data and a touch threshold value to determine whether there is the user's touch.

10. The touch sensing method of claim 8, further comprising, before the calculating of a DTX compensation value, measuring the maximum DTX amplitude of the touch sensing block, which is obtained when the maximum grayscale value is applied to the plurality of pixels corresponding to the touch sensing block, to calculate a lookup table.

* * * * *